United States Patent [19]

McGowan

[11] 4,211,610

[45] Jul. 8, 1980

[54] APPARATUS FOR HEAT AND MASS TRANSFER

[75] Inventor: Raymond J. McGowan, Markham, Canada

[73] Assignee: The Cambrian Engineering Group Limited, Mississauga, Canada

[21] Appl. No.: 400,767

[22] Filed: Sep. 26, 1973

[30] Foreign Application Priority Data

Oct. 12, 1972 [CA] Canada .................................. 153753

[51] Int. Cl.[2] ............................................. B01D 3/02

[52] U.S. Cl. .................................... 202/177; 202/233; 202/234

[58] Field of Search ...................... 203/95, 96, 49, 100, 203/91, 92; 159/165; 202/233, 234, 237, 177, 205

[56] References Cited

U.S. PATENT DOCUMENTS

| | | | |
|---|---|---|---|
| 1,060,607 | 5/1913 | Kestner | 159/16 S |
| 2,163,303 | 6/1939 | Bonotto | 202/233 X |
| 2,164,274 | 6/1939 | Ittner | 202/233 X |
| 2,871,116 | 1/1959 | Clark | 159/16 R |
| 3,268,501 | 8/1966 | Crouch et al. | 159/16 S |
| 3,397,731 | 8/1968 | Gravis et al. | 203/49 X |
| 3,607,670 | 9/1971 | King | 202/233 |

FOREIGN PATENT DOCUMENTS

| | | | |
|---|---|---|---|
| 276664 | 7/1914 | Fed. Rep. of Germany | 159/25 R |
| 496193 | 11/1938 | United Kingdom | 159/16 R |
| 990425 | 4/1965 | United Kingdom | 159/16 S |

*Primary Examiner*—Wilbur L. Bascomb, Jr.
*Attorney, Agent, or Firm*—Rogers, Bereskin & Parr

[57] ABSTRACT

A heat and mass transfer method and apparatus in which a vertically extending conduit defines an upward flow path for a mixture of vapor and liquid. In a disclosed embodiment of a deodorizer, steam is injected into edible oil or fat and causes it to follow an extended, serpentine flow path. Since the deodorizer is operated at sub-atmospheric pressure, the steam expansion is large and promotes efficient heat and mass transfer.

2 Claims, 5 Drawing Figures

OIL
STEAM
DOWTHERM
STEAM
OIL
5
5
60
62
17
61
12
13
14
14
14
10
40
43
43
44
45
45
22
42
41
25
20
11
16
21
44
44
44
42
42
22
25
20

APPARATUS FOR HEAT AND MASS TRANSFER

This invention relates to a method and apparatus for heat and mass transfer between fluids and a particular embodiment relates to an apparatus for deodorizing edible fats and oils.

This invention provides a zone for heat and mass transfer between a fluid predominantly in the liquid phase and a fluid predominantly in the vapour phase. A vertical conduit member defines this zone and the introduction of the vapour phase into the liquid phase causes upward flow through the conduit member. When utilized in apparatus for deodorizing edible fats and oils a plurality of conduit members are arranged to provide an elongated flow path for the oil with steam constituting the vapour phase fluid.

DESCRIPTION OF THE PREFERRED EMBODIMENTS

Figure 3:
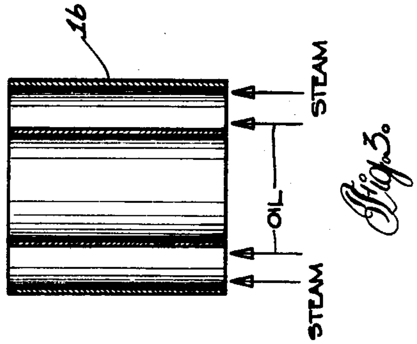
FIGS. 1, 2 and 3 are perspective views of typical conduit members useful in the practice of the present invention.
Figure 2:
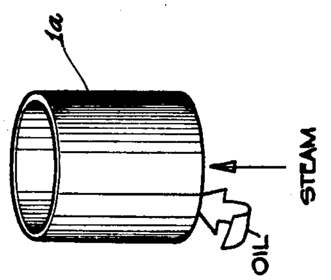
Figure 1:
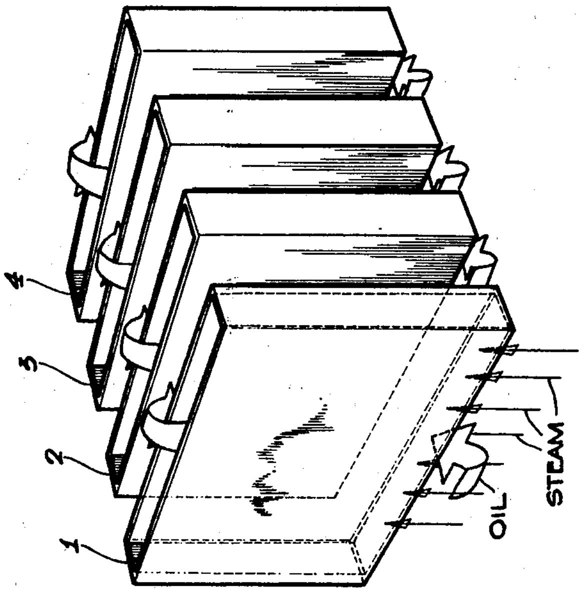

FIGS. 1, 2 and 3 give a simplified representation of a structure and a method for promoting heat and mass transfer between a fluid predominantly in the liquid phase (here shown as oil) and a fluid predominantly in the vapour phase (here shown as steam). The steam is introduced at the foot of conduit 1, preferably through a steam sparger. The mixture of steam and oil rises to the top of the conduit where it overflows. FIG. 1 shows a series of conduits in which the overflow from conduit 1 is entrained in a further supply of steam to conduit 2 and so on to conduit 4, thus providing an extended flow path for the oil.

The shape of the conduit member is not critical and, as shown in FIG. 2 it may be in the form of a circular cylinder 1*a* or, as shown in FIG. 3, a cylindrical annulus 1*b*. Desirably, the apparatus is operated under a partial vacuum allowing expansion of the steam to promote turbulent motion and enhanced heat and mass transfer between the fluids.

A deodorizer for edible fats and oils will now be described with reference to FIGS. 4 and 5. Canadian Pat. No. 873,859 issued June 22, 1971 may be referred to for general information regarding such deodorizers. The structure to be described in connection with FIGS. 4 and 5 of this application performs the same function as heating and deodorizing section 20 and cooling section 40 of the above-identified patent.

Figures 4, 5:
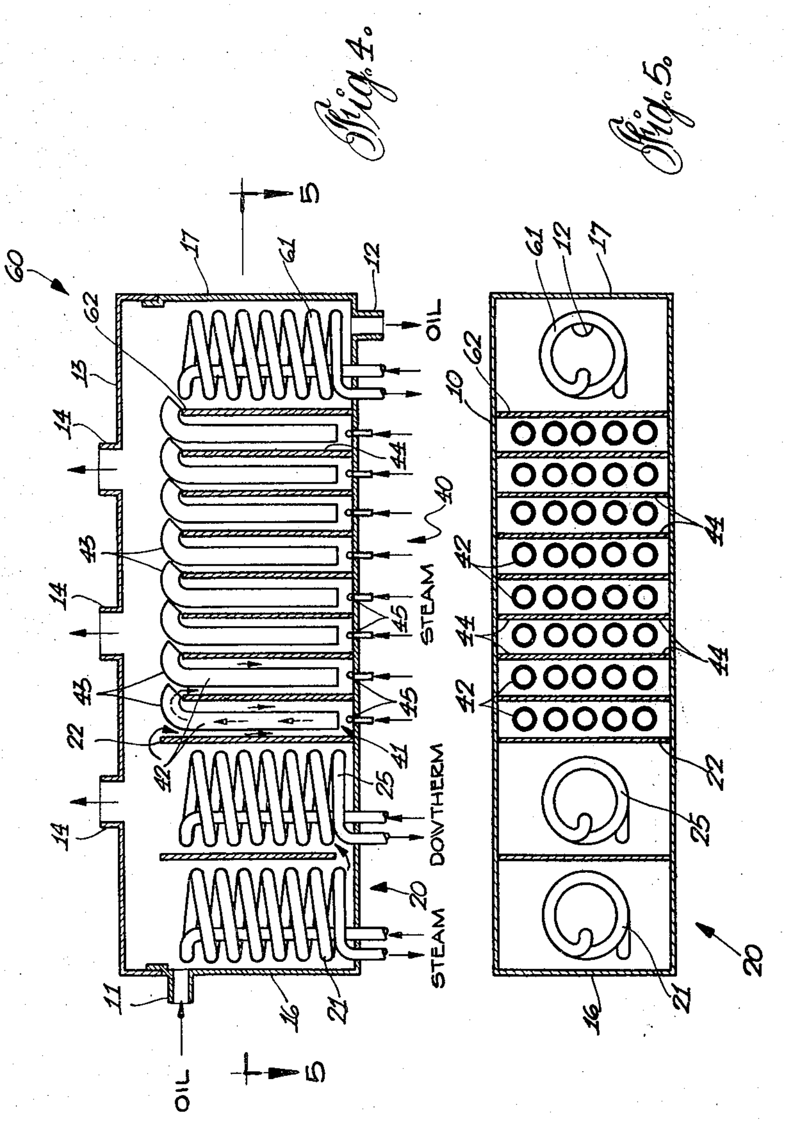
FIG. 4 is a longitudinal cross-sectional view of a deodorizer in accordance with the present invention.
FIG. 5 is a cross-sectional view taken along the line 5—5 in FIG. 4.

With reference to FIGS. 4 and 5, the deodorizer consists of a stainless steel vessel 10. All of the processing steps of preheating, deaeration, high temperature heating, deodorization and cooling are carried out in the vessel 10 under vacuum. The vessel is formed with a fluid inlet opening 11 at one end 16 and a fluid outlet opening 12 at the other end 17. Fluid flows from the inlet end to the outlet end and thus defines the forward longitudinal direction of the vessel.

A removable cover 13 sealingly engages the upper end of the vessel 10. The cover 13 includes a number of openings 14 which are connected to a vacuum exhaust system (not shown). The vacuum exhaust system serves to maintain the vessel in a state of sub-atmospheric pressure to permit a given weight of steam injected into the vessel to expand to greater volumes and thereby create greater surface area for heat and mass transfer.

Although the disclosed embodiment relates to a stainless steel vessel 10 it will be clear to those knowledgeable in the art that an outer vessel of material other than stainless steel could be used containing a tank or tray fabricated from stainless steel. Such an arrangement would have the advantages of the economy due to reduced stainless steel fabrication and the elimination of air leakage into the tank or tray contacting the oil.

Referring again to FIGS. 4 and 5, the vessel 10 is comprised of essentially three sections, a fluid heating section 20, a fluid-steam contact section 40 and a fluid cooling section 60. The three sections are in sequential fluid communication with each other.

The heating section 20 and the cooling section 60 are of conventional form and here consist of heating coils 21 and 25 and a cooling coil 61. Heating coil 21 is supplied with steam for preheating the oil or fat and heating coil 25 is supplied with an organic fluid such as is known under the trade mark DOWTHERM for final heating. The cooling coil 61 is supplied with a cooling fluid such as water. A baffle 22 separates the heating section 20 from the heat and mass transfer section 40 and a baffle 62 separates the cooling section 60 from section 40. The efficiency of the heating and cooling sections can be increased by the use of sparging steam. Since tank 10 is operated at sub-atmospheric pressure the expansion of such sparging steam promotes the necessary turbulence for improved heat transfer.

The present invention relates to an improved steam-oil contacting section 40. Section 40 is a multistage arrangement wherein each stage 41 can be regarded as in inverted U-shaped channel which extends transversely of the vessel and directs a major component of flow in a vertical direction.

The inverted U-shaped channels are formed by a plurality of horizontally spaced rows of vertically extending conduit members 42 each terminating in a forward extending portion 43. Each row of conduits 42 is separated from its neighbouring rows by baffles 44 attached to the side and bottom walls of the vessel. Thus fluid flow in each U-shaped channel 41 is defined by an upward movement through conduit 42 and downward flow from orifice 43 between baffle 44 and the exterior of the next row of conduits.

The U-shaped channels or stages 41 are in sequential fluid communication with each other and form a generally serpentine path for fluid flow having a major component of flow in a vertical direction.

In the lower end of each conduit member 42, there is positioned a steam sparger unit 45. The steam sparger unit 45 serves a dual purpose. Firstly, it emits steam for the distillation of the oil and secondly, provides the motive force for two phase flow in either ripple, film or mist form.

Sparger coil or units 45 are continuously supplied with fresh steam maximizing the driving force for heat and mass transfer and deodorizing efficiency.

OPERATION

Oil to be deodorized is initially fed into heating section 20 through inlet pipe or opening 11. Once the oil has reached steam-oil contacting section 40, it will have been heated to a suitable temperature for the deodorizing process.

The oil will then be forced upwardly in the first row of conduits 42 by the steam sparger 45. The sub-atmospheric pressure in the vessel allows the steam to expand to a greater volume providing a larger area for steam-oil contact. The volatile free fatty acid flavours and odours are transferred from the oil to the steam and the steam and oil separate as they leave the forwardly extending portions 43.

Oil leaving the last channel or stage 41 of section 40 flows directly into cooling section 60 where the oil is cooled by contacting coil 61. The cooled oil is drained through outlet 12.

It can be readily seen, therefore, that the above described deodorizer provides an efficient and compact means for deodorizing oils and fats. It is also apparent that the present apparatus need not be restricted in use to deodorizing oils and fats. It may serve equally well with slight modifications as a gas-liquid contacting apparatus, i.e. as a chemical reactor.

The embodiments of the invention in which an exclusive property or privilege is claimed are defined as follows:

1. An apparatus for deodorizing oils comprising, a vessel having first, second and third sections in sequential overflow fluid communication with each other, heating means in said first section, cooling means in said third section, said second section defining a plurality of inverted vertically oriented L-shaped channels in sequential fluid communication with each other, each channel having oil inlet and outlet means at bottom and top respectively, steam injecting means located at the bottom of the vessel discharging into said inlet means, said outlet means comprising a steam-oil outlet at an upper portion of each said channel, whereby oil is induced to flow through said channel by said steam injection means, said plurality of channels defining a substantially extended serpentine path for fluid flow having a major component in a vertical direction.

2. Apparatus for simultaneous heat and mass transfer between a first fluid predominantly in the vapor phase and a second fluid predominantly in the liquid phase, wherein the apparatus is adapted for the deodorizing of oil and fat which constitutes said second fluid and wherein said first fluid is steam, the apparatus comprising a vessel having first, second and third sections for sequential overflow of said second fluid from one section to the other, liquid heating means in said first section and liquid cooling means in said third section, means introducing said second fluid into said first section, vertical walls and conduit members in said second section defining an extended serpentine flow path, said path including an alternating sequence of (a) channels for upward flow formed between spaced apart walls of a plurality of said conduit members each terminating in a portion directing fluid longitudinally forward in said vessel and (b) channels for downward flow formed between the walls and conduit members, and steam injection means located adjacent the foot of the channels to cause upward flow of said second fluid in said path with a major component of said flow therein being in a vertical direction.

* * * * *